March 4, 1941.  P. W. LICHTENBERGER  2,233,789

GARBAGE AND WASTE RECEPTACLE

Filed Oct. 30, 1939

Inventor:
Paul W. Lichtenberger,
By W. W. Williamson
Attorney.

Patented Mar. 4, 1941

2,233,789

UNITED STATES PATENT OFFICE 2,233,789

GARBAGE AND WASTE RECEPTACLE

Paul W. Lichtenberger, Philadelphia, Pa.

Application October 30, 1939, Serial No. 301,903

5 Claims. (Cl. 220—38)

My invention relates to new and useful improvements in a garbage and waste receptacle and has for one of its objects to provide a simple and effective device of this character wherein the lid or cover is effectively held in a closed position to practically prevent opening thereof by cats, dogs and the like even if the receptacle is knocked over.

Another object of the invention is to provide a construction of lid or cover mounting in which said lid or cover will be moved to its closed or open positions automatically, during the final portions of said movements.

Another object of the invention is to mount the lid or cover on the body of the receptacle by means of a toggle including the bail handle as a part thereof.

Another object of the invention is to utilize gravity or a spring in the closing and opening operations of the lid or cover, and where a spring is used this provides additional effective means for holding the lid or cover in its closed position.

A further object of the invention is to provide a closable container comprising a can body, a bail handle swingingly connected to said body, a lid or cover slidably mounted between the legs of said bail handle, levers associated with said lid or cover and with brackets on the body, said brackets and levers and handle constituting a toggle to cause the lid or cover to slide longitudinally of the bail handle legs as said handle is swung up and down, and a spring to urge the lid or cover towards the pivot points of the handle.

A still further object of this invention is to generally improve the construction of a garbage or waste receptacle whereby it may be readily carried from place to place and easily emptied.

With the above and other objects in view this invention consists of the details of construction and combination of elements hereinafter set forth and then designated by the claims.

In order that those skilled in the art to which this invention appertains may understand how to make and use the same I will describe its construction in detail referring by numerals to the accompanying drawing forming a part hereof, in which.

Figure 1:
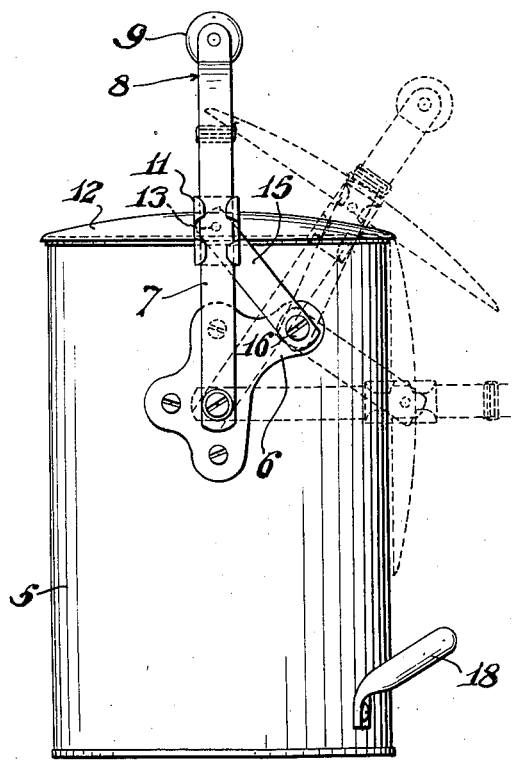
Fig. 1 is a side elevation of a garbage and waste receptacle constructed in accordance with my invention illustrating in dotted lines the open and an intermediate position of the lid or cover.
Figure 2:
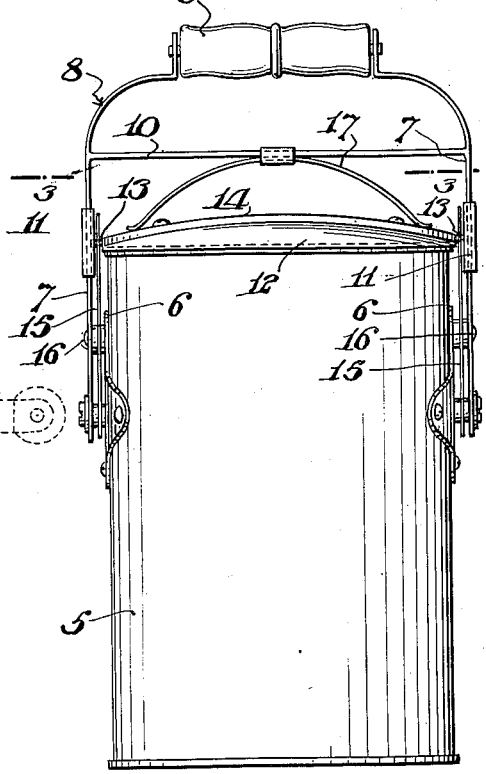
Fig. 2 is a front elevation of the same.
Figure 3:
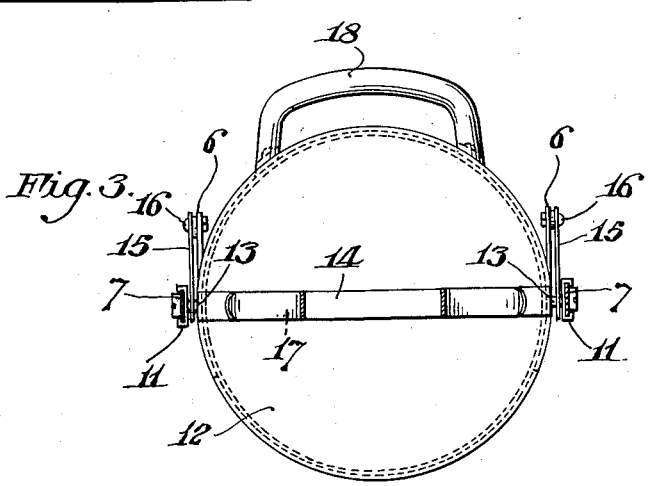
Fig. 3 is a section on the line 3—3 of Fig. 2.

In carrying out my invention as herein embodied 5 represents the body or container having brackets or arms adjacent the upper end at opposite sides and projecting rearwardly in parallelism to provide free outer ends.

To the same sides of the body carrying the brackets are pivoted the lower ends of the legs 7 of the bail handle 8 so as to be swingingly mounted and the fulcrums for said bail handle may be parts of the brackets or separate therefrom. The bail handle also includes a handhold 9 and a crosspiece or bar 10 at a position between the handhold and the top of the body or container.

Shoes 11 are slidably mounted on the legs of the bail handle and may embrace said legs as shown or mounted in some equivalent manner as in slots in the handle legs.

The lid or cover 12 has trunnions 13 which are fastened or fixed to the shoes and said trunnions may be parts of a rib 14. To each trunnion is pivoted one end of each of the levers 15 and the opposite end of each of said levers is pivoted to the outer free end of a bracket or arm 6, as at 16.

This arrangement provides a toggle at each side of the apparatus including the legs of the bail handle as parts thereof. When the bail handle is swung towards the pivot points 16 the levers 15 cause the shoes 11 to slide upward or outward along the legs 7 thus raising the lid or cover so it can pass over the rim or top edge of the body or container and after the levers pass the pivot points 16 the toggle construction will cause the lid or cover to move inward until it contacts the rear of the body or container. The reverse action takes place when the lid or cover is being closed. After the levers 15 pass the pivot points 16 in either direction gravity will cause the lid or cover to finally move to its open or closed position as the case may be.

To make the final opening and closing movements of the lid or cover positive and assist in holding said lid or cover in its closed position spring means 17, such as a flat leaf spring, may be secured to one of the members 10 or 14 and arranged to engage the other of said members. For purposes of illustration said spring is shown as fixed intermediate its ends to the crosspiece 10 leaving the ends free to contact the rib 14 and urge the lid or cover towards the fulcrums of the bail handle.

To the rear of the body or container 5 adjacent its lower end is secured the grip loop 18 so that when the receptacle is to be emptied the bail handle may be grasped by one hand and the grip loop by the other hand and then by drawing them towards each other the receptacle cover can be opened, the receptacle lifted and inverted all in one operation.

Of course I do not wish to be limited to the exact details of construction herein shown and described as these may be varied within the scope of the appended claims without departing from the spirit of my invention.

Having described my invention what I claim as new and useful is:

1. A garbage and waste receptacle comprising a body open at the top, a cover to close said top opening, a bail handle pivoted to opposite sides of the body below the top, shoes slidably mounted on the bail handle and connected with the cover, supports on the receptacle body, and levers having their outer ends pivoted to the shoes and their inner ends pivoted to the supports at one side of the handle relative to its upright position and between the fulcrums of the handle and shoes.

2. The structure in claim 1, in combination with spring means to urge the cover towards the handle fulcrums.

3. A device of the kind described comprising a body open at the top, a bail handle fulcrumed to the body below the open top, shoes slidably mounted on the legs of the bail handle, brackets carried by the body with portions projecting from the body, levers pivoted to the shoes and to said brackets intermediate the two extreme positions to which said handle can swing, said levers and brackets and bail handle forming toggles which cause the shoes to slide longitudinally of the handle as the latter swings from side to side, a cover attached to said shoes, a crosspiece on the handle, and a spring between said crosspiece and the cover.

4. The structure in claim 3 wherein the spring is of the flat leaf type and is fixed intermediate its ends to the crosspiece.

5. A receptacle of the class described comprising a container body open at the top, a bail handle including legs and a crosspiece between the legs intermediate the upper and lower ends thereof, said bail handle being fulcrumed on the body at opposite sides thereof below the open top, shoes slidably mounted on the legs of the bail handle, brackets mounted on the sides of the body and projecting rearwardly in parallelism and providing free ends, a cover for the body, a rib to which the cover is attached, trunnions at the ends of said rib and fixed to the shoes, levers pivoted to the trunnions and the free ends of the brackets, and a flat spring fixed to the crosspiece and bearing against the rib to urge the cover and component parts towards the fulcrums of the bail handle.

PAUL W. LICHTENBERGER.